United States Patent [19]

Yoo

[11] Patent Number: 5,450,210
[45] Date of Patent: Sep. 12, 1995

[54] VIDEO LIBRARY SYSTEM USING RECORDED INDEX INFORMATION AND STORED LIBRARY DATA

[75] Inventor: Jae C. Yoo, Seoul, Rep. of Korea

[73] Assignee: Samsung Electronics Co., Ltd., Kyungki-do, Rep. of Korea

[21] Appl. No.: 99,547

[22] Filed: Jul. 30, 1993

[30] Foreign Application Priority Data

Jul. 31, 1992 [KR] Rep. of Korea ............... 92-13756

[51] Int. Cl.$^6$ .................................... H04N 5/782
[52] U.S. Cl. ................................ 358/335; 358/312; 360/33.1
[58] Field of Search ............ 358/335, 312, 311; 360/33.1, 10.1, 14.3, 27, 72.1; H04N 5/782; 348/563, 468

[56] References Cited

U.S. PATENT DOCUMENTS

| 5,012,334 | 4/1991 | Etra | 358/311 |
| 5,097,348 | 3/1992 | Suetaka | 358/335 |

FOREIGN PATENT DOCUMENTS

| 0257534 | 8/1986 | European Pat. Off. |
| 0405939 | 6/1990 | European Pat. Off. |
| 0393955 | 10/1990 | European Pat. Off. | H04N 5/782 |
| 0472147 | 8/1991 | European Pat. Off. |
| 2091021 | 7/1982 | United Kingdom |

OTHER PUBLICATIONS

Wolfgang Kornhaas, "Von der Textprogrammierung über TOP zum Archivsystem," 2421 Radio Fernsehen Elektronik, vol. 40, No. 8 (1991), Berlin, DE, pp. 465–468.

*Primary Examiner*—Tommy P. Chin
*Assistant Examiner*—Huy Nguyen
*Attorney, Agent, or Firm*—Sughrue, Mion, Zinn, Macpeak & Seas

[57] ABSTRACT

A video library system for an apparatus using a video tape accumulates index information regarding the video tape and includes a memory storing the library data, a microcomputer, an on screen display circuit and a pair of adders. Index information is added via the first adder to the vertical blanking interval of the composite video signal under the control of the microcomputer and the library data is built and stored in the memory with library data corresponding to the index information. The microcomputer also permits the library data to be output to a monitor via on screen display circuit and the second adder.

10 Claims, 7 Drawing Sheets

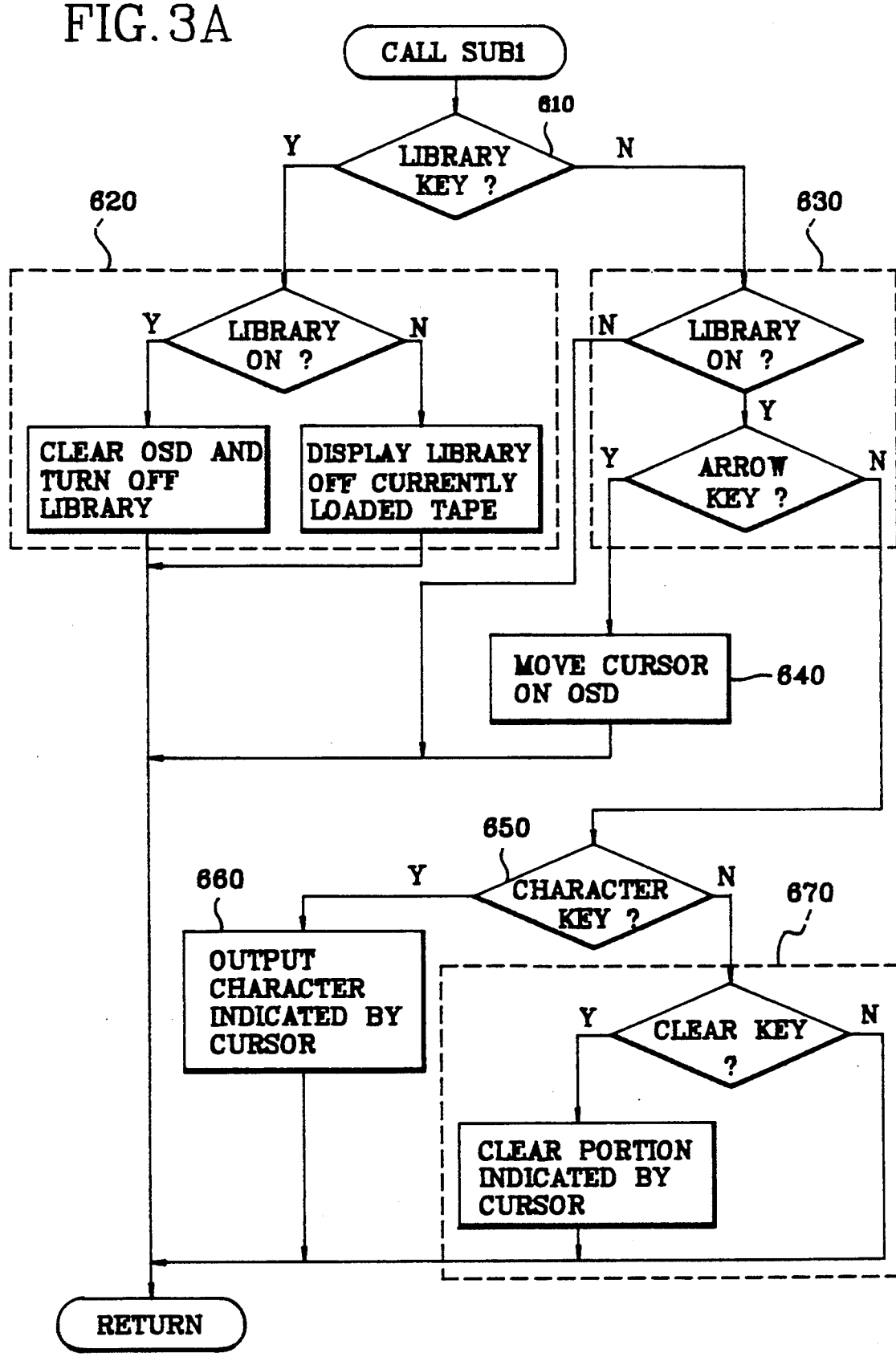

FIG. 4
| TAPE ID CODE : X X X X ||||
|---|---|---|---|
| ID CODE | ON/OFF TIME OF PROGRAM || TITLE |
| 0001 | 10:00 | 11:00 | PROGRAM-1 |
| 0002 | 8:00 | 9:00 | PROGRAM-2 |
| 0003 | 6:00 | 7:00 | PROGRAM-3 |
| ⋮ | ⋮ | ⋮ | ⋮ |
CURSOR POSITION (pointing to PROGRAM-1)
LIBRARY
FIG. 5A
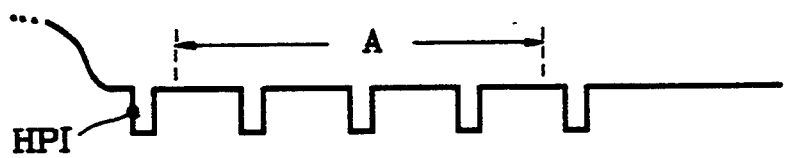
FIG. 5B

VIDEO LIBRARY SYSTEM USING RECORDED INDEX INFORMATION AND STORED LIBRARY DATA

BACKGROUND OF THE INVENTION

1. Field of the Invention

The present invention relates to an apparatus with a video index function such as video cassette recorders (VCRs) and camcorders using a video tape, and more particularly to a video library system wherein index information is recorded on a control track of a tape and is detected during the vertical blanking period of a video signal while recording or reproducing the video signal with respect to video tape to thereby allow a portion desired by a user to be searched with a simple operation of function keys. A method for improved searching is also disclosed.

2. Description of the Prior Art

In order to find a video signal of a desired portion among recorded contents on a video tape, a video index search system (VISS) and a video address search system (VASS) are employed in apparatuses such as VCRs and camcorders using the video tape. A classification label may be attached on the video tape. The VISS is utilized to facilitate the search of recorded contents on the video tape during playing thereof by storing a specific index signal on a control track of the video tape in advance at the start point of recording. The VASS facilitates the search of recorded contents on the video tape during playing thereof by storing a specific index address on the control track of the video tape in advance at the start point of recording. The specific address corresponds to a point of the video tape at which the recording begins, and value of the specific address differs according to the recording point.

However, the adoption of the VISS or VASS has the following problems in searching the recorded contents on the video tape.

With VISS, since each index signal recorded on every recording point is the same throughout the video tape, the video tape must be played from its beginning to the end when searching for the desired contents. With VASS, a fixed address can be utilized when the exact position of the desired content from the start point of the search is already perceived. When the position of the desired content is not definite, the search must be performed from the start point of the search to the end of the video tape or must be performed after rewinding the video tape. If a desired picture is not then displayed, unsearched portions must be searched. Consequently, all contents recorded on the video tape should be searched.

To search the recorded contents on the video tape, the present invention employs a video library system (hereinafter referred to as "VLS") which does not adopt VISS or VASS and does not require labelling on the video tape. The VLS stores information data on the video tape to inform the user of information data about the video tape. In other words, when one video tape among several tapes is inserted into a set (e.g., VCR), information indicating the order of the inserted tape among the tapes and information registered by the user during recording are inserted to inform the user of the location of the recorded content. Then, the information about the video tape is recorded or played, using a remote controller or key board installed on the set.

A technique for recording and playing message data in a vertical blanking period is disclosed by U.S. Pat. No. 5,097,348. However, this technique utilizes only a superimposition function.

SUMMARY OF THE INVENTION

Therefore, it is an object of the present invention to provide a video library system for recording or playing an index (ID) code indicating information about the video tape during vertical blanking period of a video signal to enable a user to search a desired picture without using the VISS or VASS. A method for embodying the video library system is also provided.

To achieve the above object of the present invention, there is provided a video library system capable of searching content desired by a user by recording index information in a composite video signal loaded on a video tape during a vertical blanking period and reproducing the recorded index information. A sync signal separator separates a vertical sync signal and a horizontal sync signal from the composite video signal. A microcomputer counts the horizontal sync signal separated by means of the sync signal separator to determine the vertical blanking period including the index information recorded therein, and outputs the index information to be recorded in the vertical blanking period of the composite video signal as well as outputs data for displaying the index information on a screen and a plurality of control signals for performing a search operation. Memory means stores a library corresponding to the index information processed in the microcomputer to input and output the library. Then, an index separator separates and decodes the index information loaded in the vertical blanking period, which is supplied from the microcomputer, and outputs the decoded signal to the microcomputer. A motor drives the video tape to search the index information recorded on the video tape in response to the control signal from the microcomputer, and an adder adds the index information from the microcomputer to the composite video signal from a plurality of video signal input sources to output the result of addition. An on-screen display finally combines the index information and library from the microcomputer with the composite video signal from the adder to output the result of the combination.

To achieve another object of the present invention, there is provided a method for embodying a video library system for recording and reproducing index information formed of a tape index code and an index code and stored in a vertical blanking period of a video signal, and selecting a desired video signal by confirming a library corresponding to the index information by a user, including the steps of:

checking the insertion of a new video tape;

detecting the vertical blanking period from the video signal when the video tape is newly inserted;

checking the existence of the index code in a vertical blanking signal of the vertical blanking period when vertical blanking period is detected, and reading out the library corresponding to the index code from the microcomputer;

checking the start of recording when the video tape is not newly inserted, and checking a mode whether it is of a recording or not after increasing the index code when the start of recording is confirmed;

checking the insertion of a new video tape when the mode is of the recording, and outputting the index code for displaying on a screen after increasing the tape index code when the video tape is the new one;

displaying the library on the screen during performing the above-described steps in all case that the vertical blanking period is not detected, the mode is not of the recording regardless of inserting a used video tape, and the library corresponding to the index code is already read out by the microcomputer; and searching the video signal corresponding to the received index code, after confirming the content of the library displayed on the screen.

BRIEF DESCRIPTION OF THE DRAWINGS

The above objects and other advantages of the present invention will become more apparent by describing in detail a preferred embodiment thereof with reference to the attached drawings in which:

FIGS. 3A to 3E are flow charts for showing the subroutine and supplemental steps of the method according to FIG. 2;

FIG. 4 illustrates states displayed on a screen during a library operation; and

FIGS. 5A and 5B are waveforms showing horizontal and vertical sync signals, respectively.

DETAILED DESCRIPTION OF THE PREFERRED EMBODIMENTS

Figure 1:
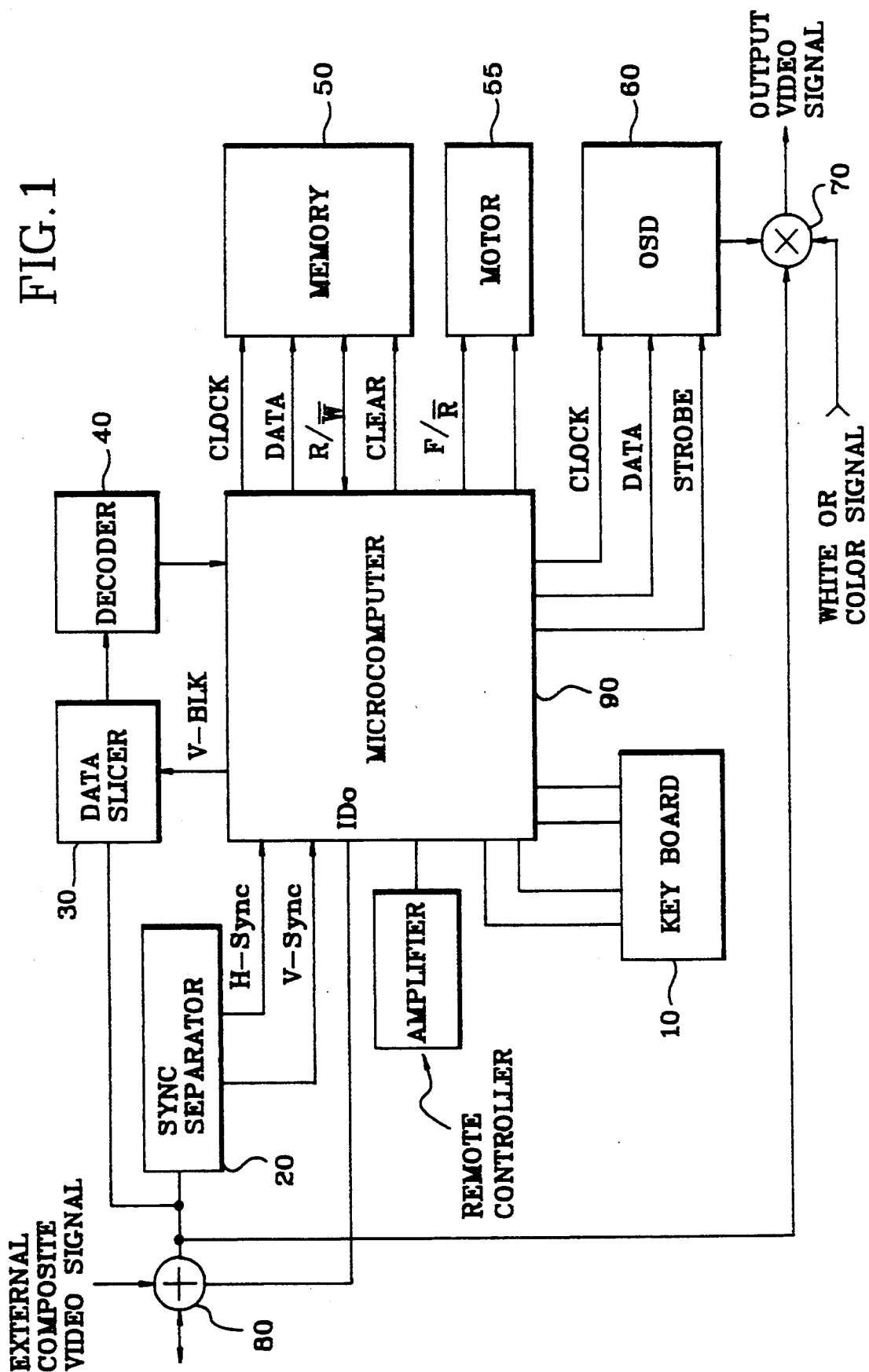
FIG. 1 is a block diagram showing a video library system according to the present invention.

Referring to FIG. 1, a composite video signal is received from an unshown external video signal source, i.e., a video signal input line and a tuner, via an adder 80. A microcomputer 90 is connected to a sync signal separator 20 for separating a horizontal sync signal H-sync and a vertical sync signal V-sync from the composite video signal. One side of the microcomputer 90 is connected to an index separator unit consisting of a data slicer 30 and a decoder 40.

The microcomputer 90 counts the horizontal sync signal H-sync and vertical sync signal V-sync. By this counting operation, a vertical blanking period which includes ID information of a tape ID code designating the tape number and an ID code designating a start point of the recording is determined, so that the microcomputer 90 outputs a vertical blanking signal V-BLK of the vertical blanking period which has the ID information, thereby controlling the reproduction of the ID information.

When the vertical blanking signal V-BLK determined as above is output from the microcomputer 90 to the data slicer 30, ID information stored during the recording is separated in the data slicer 30 from the composite video signal which is received from the adder 80 to the data slicer 30 by means of the vertical blanking signal V-BLK. The decoder 40 is connected to the data slicer 30 to decode the separated ID information into a signal recognizable by the microcomputer 90.

The microcomputer 90 is also connected to a memory 50 for storing a library corresponding to the ID code which increases one by one per recording, a motor 55 driven by a control voltage and a control signal F/R from the microcomputer 90, and a key board 10 incorporated with keys for controlling the microcomputer 90 such as a search key, a clear key, a library on/off key, character keys. An amplifier is connected to the microcomputer 90 for amplifying an unshown remotely-controlled signal.

The microcomputer 90 is further connected to an on-screen display (OSD) 60 for displaying the ID code and library corresponding to the ID code extracted from the memory 50 in response to the input by the key board 10. The OSD 60 is connected to a mixer 70 which combines the composite video signal from the adder 80 with an on-screen display signal from the OSD 60 to thus output the result of the combination. A white or color signal for controlling color of a character displayed on a screen is received from one side of the mixer 70.

Therefore, the microcomputer 90 extracts the library corresponding to the ID code from the memory 50 to output the extracted library to the OSD 60. The on-screen display signal from the OSD 60 is supplied to the mixer 70 to be combined with the composite video signal from the video signal source to display the ID information on the screen. At this time, the white or color signal input to the mixer 70 controls the color of the displayed portion on the screen, which technique is well known and, thus, is not discussed further. The ID information displayed via the OSD 60 is illustrated in FIG. 4, which will be explained later in the description with reference to FIGS. 2 and 3.

The user may play, clear or change the ID code by selecting a desired library, using various functional keys on the key board 10 such as the search key, clear key, character keys and library on/off key.

Meanwhile, in case of a new tape which has no information thereon, the ID code on the tape cannot be extracted from the memory 50 when the ID code is intended to be recorded on the video tape. This is due to the fact that the memory 50 has no ID code in case of the new tape. However, the microcomputer 90 automatically outputs a tape ID code from its ID code output terminal IDo, and the tape ID code is combined with the external composite video signal (e.g., a television broadcasting signal) in the adder 80 and can be recorded. The tape ID code is also stored in the memory 50. At this time, the tape ID code and ID code are recorded in a format of 0001 as shown in FIG. 4. When the tape is not a new one, an ID code is extracted to the microcomputer 90 since the ID code is stored in the memory 50, the extracted ID code is increased by one, and the tape ID code is left unchanged. Thus, the increased ID code is combined with the external composite video signal to be recorded, and the increased ID code is also recorded on the memory 50. The reason of increasing the ID code by one is in that the ID code is increased upon recording whereas the tape ID code is increased in case of a new tape.

According to the present invention as described above, the tape ID code and ID code being index information are recorded or reproduced in the vertical blanking period of the video signal, thereby enabling the search of the library of the video tape without adopting VISS or VASS functions.

The operation of the apparatus having the above-stated construction will be described in detail with reference to FIGS. 2 and 3A to 3E.

Figure 2:
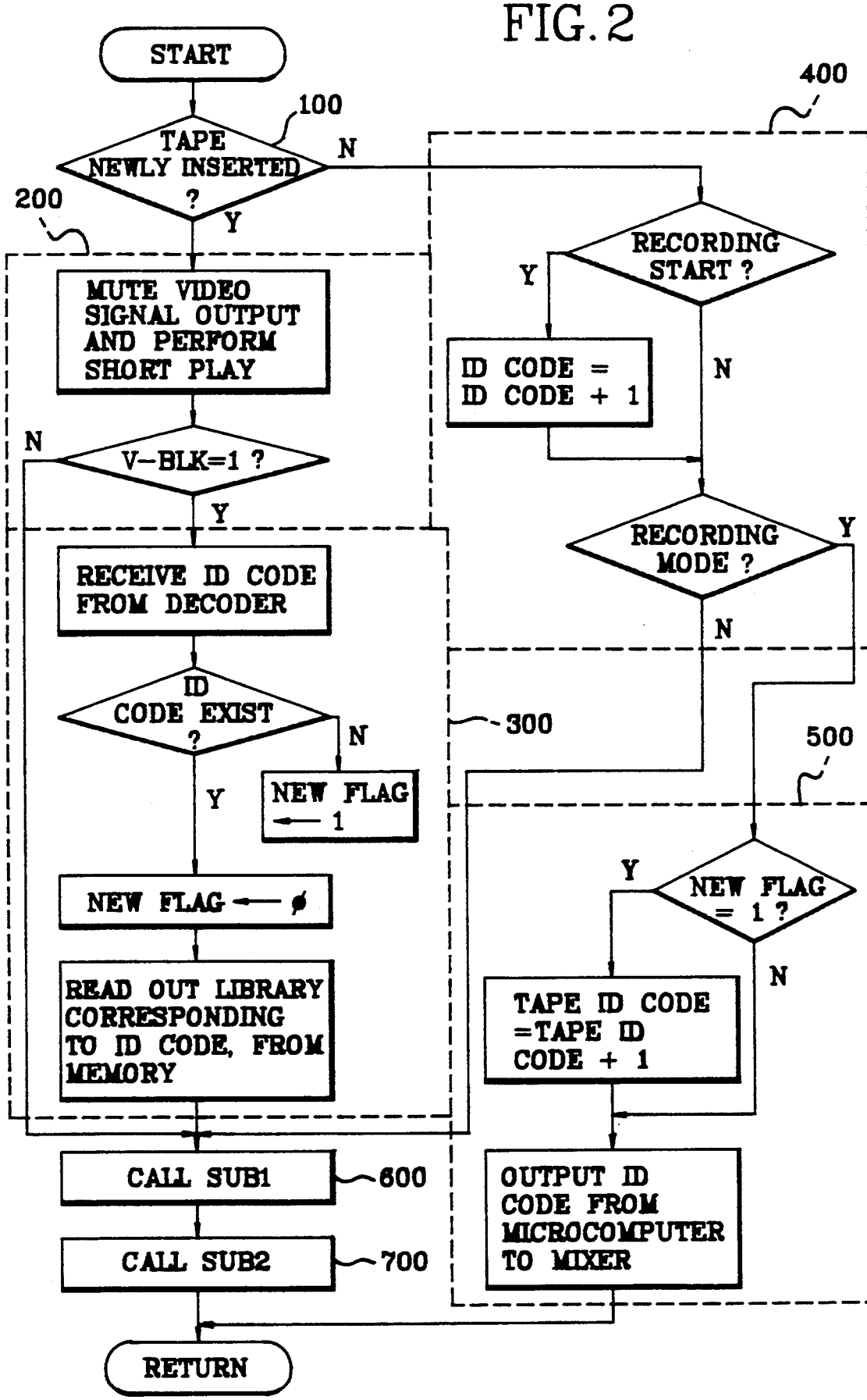
FIG. 2 is a flow chart performing a method for embodying the video library system according to the present invention.

FIG. 2 is a flow chart for performing a method embodying the video library system according to the present invention. Here, in accordance with the insertion of a video tape, an ID code or a library corresponding thereto is displayed on the screen, or the ID code is combined with the external composite video signal being recorded.

In step 100, the microcomputer 90 determines whether a video tape is newly inserted or not. In step 200, when the video tape is newly inserted, the microcomputer 90 mutes a video signal output and automatically performs a short play to check whether a vertical blanking period having the ID code exists or not. If the vertical blanking period exists in step 200, in step 300, the ID code separated from the composite video signal by means of the vertical blanking signal from the microcomputer 90 is decoded in the decoder 40 to be input to the microcomputer 90 which in turn confirms the existence of the ID code in the signal received from the decoder 40. If there is no ID code, the tape is regarded as a new one, so that a new flag is set to one. Contrarily, if there is an ID code, the tape is regarded as a used one, so that the new flag is set to zero and then the content of the library corresponding to the ID code input from the decoder 40 to the microcomputer 90 is read out from the memory 50.

On the other hand, when the video tape is not newly inserted one in step 100, step 400 is performed. In step 400, if the recording is started, the ID code is increased by one, and the mode is checked whether it is of a recording or not. When it is determined that the mode is the recording mode in step 400, in step 500, the new flag is checked whether it is set to one. If the new flag is set to one, the tape ID code is increased by one indicating that the tape being a new one. Whereas, if the new flag is not set to one, which means that the tape is not a new one, the tape ID code is not increased and the ID code is output from the microcomputer 90 to the mixer 70 for the on-screen display.

If the vertical blanking period does not exist in step 200, the mode is not the recording mode, or the step 300 is carried out, an on-screen display subroutine (hereinafter referred to as SUB1) is called for displaying the library corresponding to the ID code according to the key-input, in step 600. After performing step 600, a current ID code and an ID code selected by the user are compared with each other in accordance with the input of the search key, and the motor 55 is controlled in response to the result of the comparison. Thus, in step 700, a first search subroutine (hereinafter referred to as SUB2) is called for playing.

FIGS. 3A to 3E are flow charts for showing the subroutine and supplemental steps of the method according to FIG. 2.

FIG. 3A is a flow chart of the SUB1 of step 600 shown in FIG. 2. In step 610, the input key is checked to determine whether it is a library key for showing the ID information or not. Here, when the input key is determined as the library key, in step 620, the library-on state (i.e., the on-screen display of the library) is confirmed. Thereafter, the OSD 60 is cleared to turn off the library in case of the library-on state, or the content of the library of the currently loaded tape is displayed on the screen.

When the library-key input is not identified in step 610, in step 630, the library-on state is confirmed. In case of the library-on state, an arrow-key input is checked. When the input key is determined as the arrow key in step 630, in step 640, a cursor on the OSD displaying the title of the program corresponding to the ID code shown in FIG. 4 is moved towards a direction in conformity with the arrow key.

Meantime, if the input key is not the arrow key in step 630, the input key is checked to determine whether it is a character key or not in step 650. If the character-key input is confirmed, a corresponding character is output by means of the cursor in step 660. If the character key is not input in step 650, in step 670, a clear-key input is confirmed, so that the portion currently indicated by the cursor on the corresponding line is cleared. After performing the above-described steps, the SUB2 shown in FIG. 2 is carried out.

Figure 3B:
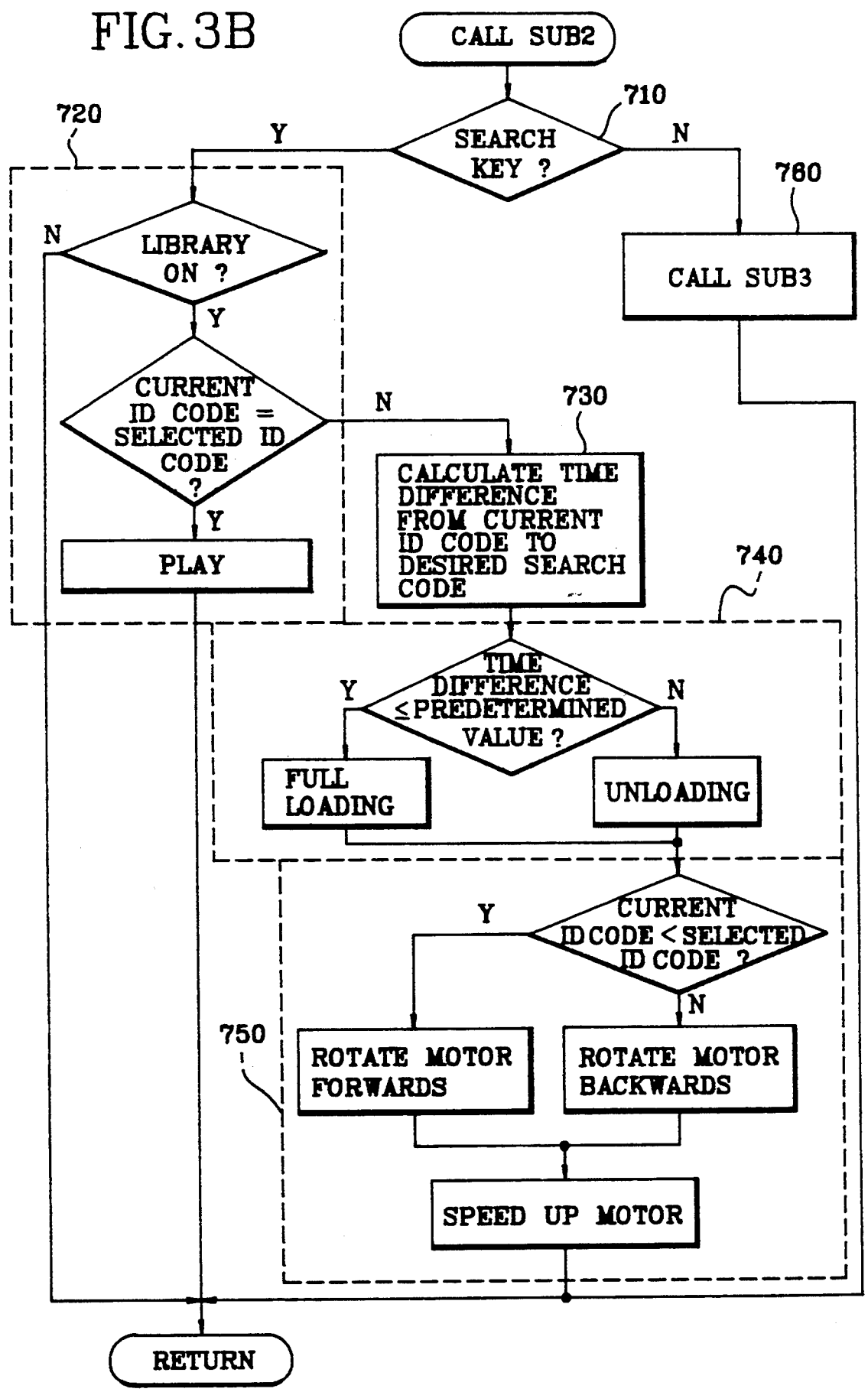

FIG. 3B is a flow chart showing the SUB2 of step 700. After performing the SUB1 of step 600, as shown in FIG. 3A, SUB2 is called in step 700. Therefore, by the input of the search key, the current ID code and the ID code selected by the user are compared with each other to control the drive of the motor 55, thereby executing the play operation.

In more detail, when step 710 determines that the input key is the search key for searching a desired program under on-screen display state, in step 720, the library-on state is confirmed. Then, in case of the library-on state, the current ID code is compared with the ID code selected by the user by means of the search key. Thus, when they are the same, the tape is played.

If the current ID code and the ID code selected by the user to be searched are not the same during step 720, a distance, i.e., time difference from the recording time of a program recorded on the current ID code to the recording time of a program recorded on the selected ID code, is calculated in step 730. In step 740, the time difference is compared with a predetermined value, so that the tape is fully loaded when the time difference is smaller than the predetermined value, or is unloaded when it is greater than the predetermined value. Referring to FIG. 4, assuming that the current ID code is 0001 having a PROGRAM-1 recorded thereon, and the selected ID code by the search key is 0003 having a PROGRAM-3 recorded thereon, the time difference from the current ID code to the ID code to be searched is two hours because the PROGRAM-1 is one hour long by 10:00 to 11:00, and the PROGRAM-2 whose ID code 0002 is one hour long by 8:00 to 9:00. Accordingly, the time difference from the ID code 0001 having the PROGRAM-1 to the ID code 0003 having the PROGRAM-3 is two hours, so that the ID code is no need to be read out for about one hour and fifty minutes. Due to this reason, the tape is forwarded an amount corresponding to one hour and fifty minutes in the unloading state in order to prevent the tape and tape head from being damaged and to minimize the time loss caused by forwarding the tape under the full-loading state for a long time. In other words, the selected program is searched by forwarding the tape under the full-loading state in case of little time difference from the program corresponding to the current ID code to the program corresponding to the selected ID code. But, if the time difference is great, the tape-travel is performed under the unloading state and then changed to be the full loading state to search for the desired program. Consequently, the predetermined value acts as a reference for determining which tape status can be used to search the desired program more quickly and safely, e.g., between the full-loading and unloading states.

After performing step 740, the size of the current ID code is compared with that of the selected ID code. The smaller current ID code than the selected ID code means that the position of the selected ID code precedes the current ID code. Thus, the motor 55 is rotated to wind the tape forwards until reaching the portion to be searched. Meantime, the larger or equal current ID code than the selected ID code means that the selected ID code is disposed after the current ID code, and thus the motor 55 is rotated to rewind the tape backwards until reaching the portion to be searched.

If step 710 determines that the input key is not the search key, a second search subroutine (hereinafter referred to as SUB3) is called in step 760 to check the existence of the sync signal for performing an operation according to the result of step 710.

Figure 3C:
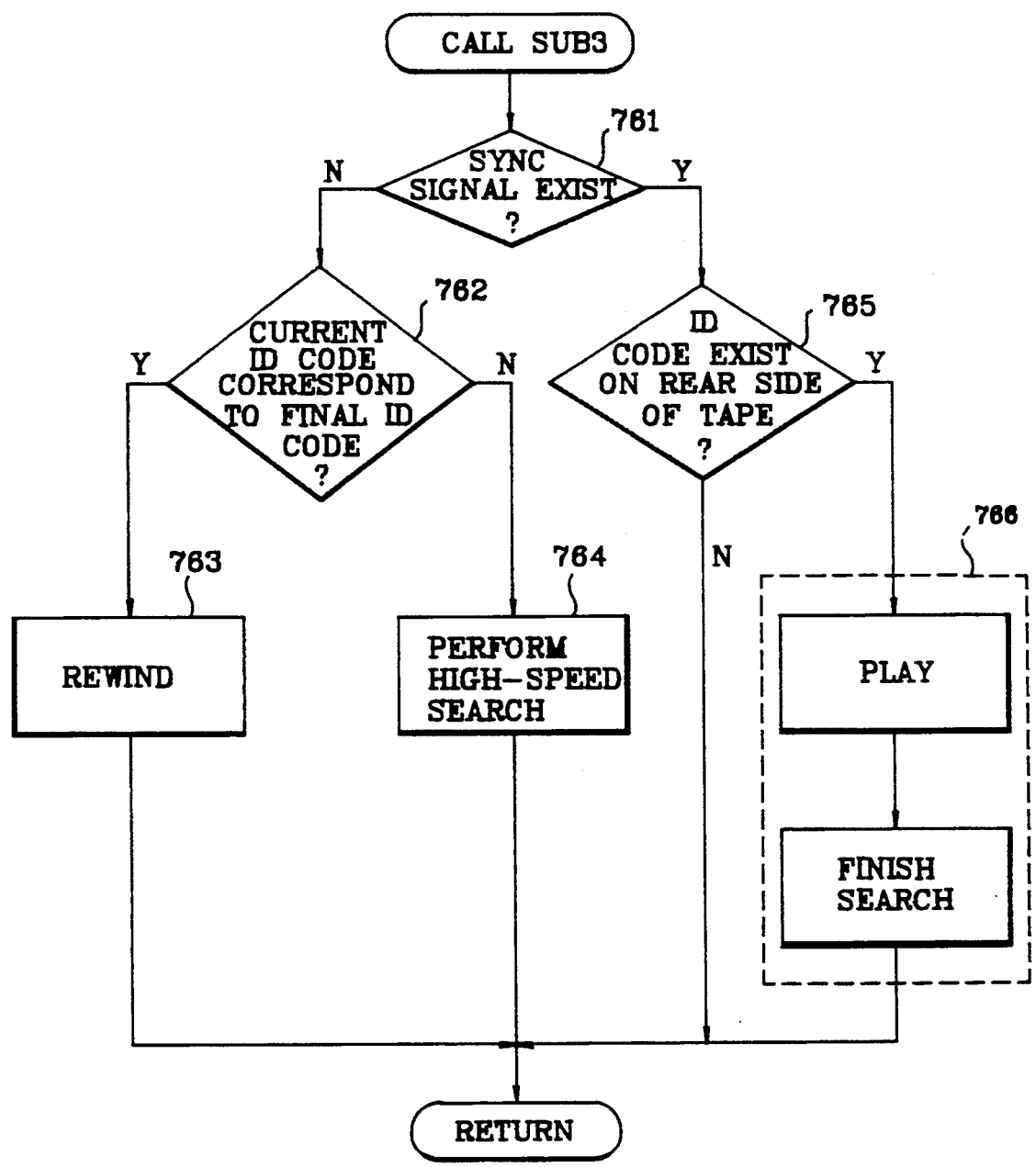

FIG. 3C is a flow chart showing the SUB3 of FIG. 3B. The existence of the sync signal is checked in step 761. When the sync signal is not detected, it is determined whether the current ID code is the final code or not in step 762. Here, the non-existence of the sync signal denotes that nothing is displayed on the screen. The result of step 762 indicates that the current ID code is the final ID code, the tape is rewound, otherwise a high-speed search is performed in step 764. Meanwhile, if the sync signal exists in step 761, the search is performed for determining the existence of the ID code behind the current position of the tape in step 765. Therefore, when the ID code exists, in step 766, the recorded content is reproduced and the search is finished.

Figure 3D:
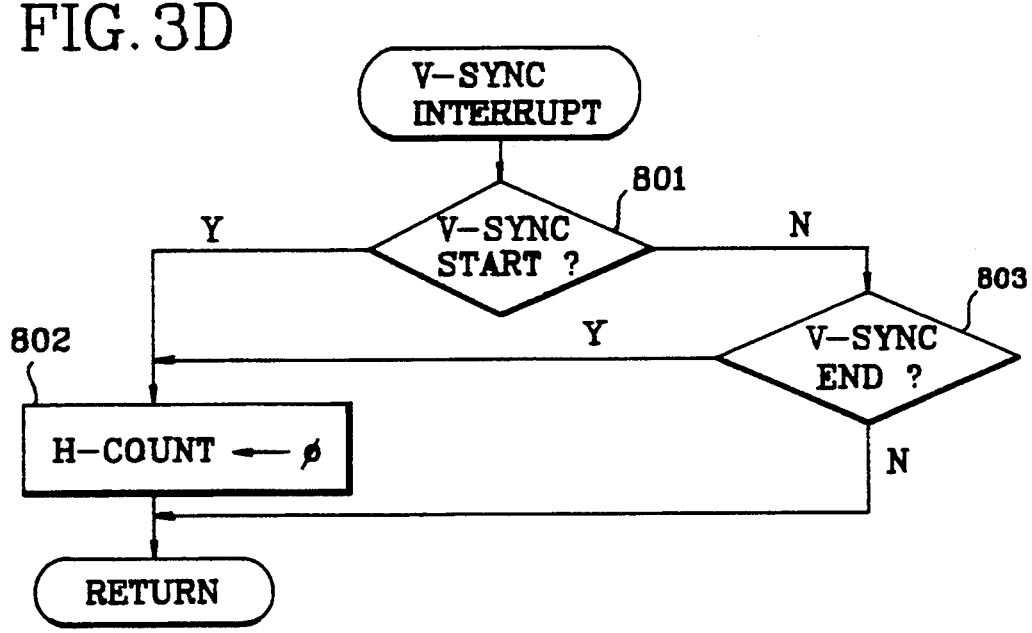
Figure 3E:
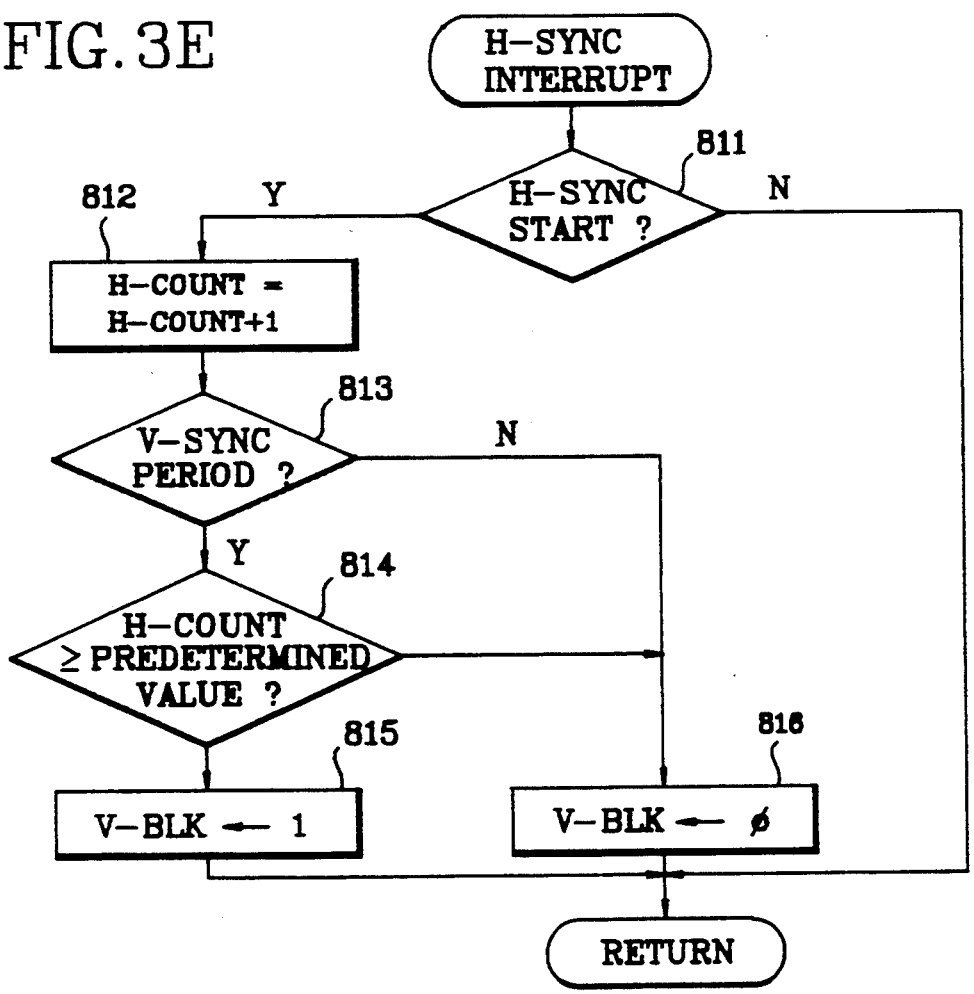

In addition to the sequential operation described heretofore with reference to FIGS. 2 and 3A to 3C, an abruptly occurring horizontal or vertical interrupt can be processed as illustrated in FIGS. 3D and 3E, respectively, which will be explained in view of FIGS. 5A and 5B.

First, as shown in FIG. 3D, the interrupt with respect to the vertical sync signal V-sync is processed as below. In step 801, the interrupt is checked to determined whether it occurs at the start point of the vertical sync signal or not. When a point indicated by VPI of FIG. 5B is determined as the start point of the vertical sync signal in step 801, the horizontal sync signal is set to zero to inhibit further counting of the horizontal sync signal since the vertical blanking period may include the ID code. When interrupt does not occur at the start point of the vertical sync signal in step 801, the interrupt is checked to determine again whether it occurs at the end point of the vertical sync signal, i.e., a point indicated by VPO in FIG. 5B, in step 803. When the point is determined as the end of the vertical sync signal, there is no need to count the horizontal sync signal due to the fact that the video signal follows the end of the vertical sync signal. Accordingly, the horizontal sync signal is set to zero to inhibit further counting of the horizontal sync signal, and then the operation being performed before the occurrence of the interrupt is continued.

On the other hand, the interrupt with respect to the horizontal sync signal is processed as below. In step 811, the interrupt is checked to determine whether it occurs at the start point of the horizontal sync signal designated by HPI in FIG. 5A or not. Thus, when the interrupt occurs at the start point of the horizontal sync signal, the horizontal sync signal is increased by one so as to search a portion having the ID code in step 812. In step 813, the interrupt is checked to determine whether it occurs during the vertical sync signal period corresponding to a section A in FIG. 5A. When the vertical sync period is confirmed in step 813, in step 814, the counted value of the horizontal sync signal is compared with a predetermined value in order to confirm the counted value of the horizontal sync signal to be included in the vertical blanking period having the ID code. When the counted value is greater than or equal to the predetermined value, the vertical blanking erasing signal is output to the data slicer 30, in step 815. If not, in step 816, the vertical blanking signal is not output to the data slicer 30 but the operation being performed before the occurrence of the interrupt is continued.

According to the present invention as described above, the horizontal and vertical sync signals are separated from the composite video signal, and the microcomputer 90 counts the sync signals to output the vertical blanking signal loading the ID code to the data slicer 30 during recording, so that the data slicer 30 separates the ID code from the composite video signal to output the separated ID code to the decoder 40. Following this operation, the decoder 40 decodes and outputs the ID code as a signal recognizable by the microcomputer 90 which in turn extracts a library corresponding to the ID code recorded during the recording from the memory 50 and then outputs the extracted library to the OSD 60. The on-screen display signal from the OSD 60 is combined with the composite video signal from the adder 80 in the mixer 70 and the result of the combination is output to be reproduced on the screen. The tape ID code and ID code displayed on the screen by means of the on-screen display signal are selected, cleared or stored again by means of various functional keys on the key board 10.

On the other hand, during recording, the microcomputer 90 extracts the ID code stored in the memory 50 to increase the ID code by one, and the result is output to the adder 80 to be combined with the externally input composite video signal and recorded. Therefore, the ID information including tape ID code and ID code can be recorded or played during the vertical blanking period.

As a result, by recording and playing the tape ID information of tape ID code and ID code in the vertical blanking period, the video library system can be embodied without adopting VISS, VASS or labels.

While the present invention has been particularly shown and described with reference to particular embodiments thereof, it will be understood by those skilled in the art that various changes in form and details may be effected herein without departing from the spirit and scope of the invention as defined by the appended claims.

What is claimed is:

1. A video library system for searching content desired by a user recording index information in a composite video signal recorded on a video tape during a vertical blanking period and for reproducing the recorded index information, comprising:

a sync signal separator for separating a vertical sync signal and a horizontal sync signal from said composite video signal;

a microcomputer for determining said vertical blanking period including said recorded index information recorded therein with respect to said horizontal sync signal, for providing the index information to be recorded during said vertical blanking period of said composite video signal, for generating data permitting display of said recorded index information on a screen, and for producing a plurality of control signals permitting a search operation to be performed;

a memory for storing library data corresponding to said recorded index information processed in said microcomputer;

an index separator for separating and decoding said recorded index information recorded during said vertical blanking period and supplied from said microcomputer, and providing a decoded signal to said microcomputer;

a motor for driving said video tape for searching said recorded index information recorded on said video tape in response to said control signals from said microcomputer;

an adder for adding said index information from said microcomputer to a received composite video signal; and means for combining said recorded index information and said library data from said microcomputer with said composite video signal from said adder so as to permit display of a combined signal.

2. The video library system as claimed in claim 1, wherein said index information comprises a tape index signal for classifying said video tape and an index signal for identifying recorded content.

3. The video library system as claimed in claim 1, wherein said index separator comprises:

a data slicer for separating said recorded index information in said vertical blanking period from said composite video signal received from said adder; and a decoder for decoding said recorded index information separated in said data slicer to produce said decoded signal recognizable by said microcomputer.

4. The video library as claimed in claim 1, wherein said means comprises:

an on-screen display for converting said recorded index information and said library data from said microcomputer into an on-screen display signal; and a mixer receiving said display signal for mixing said composite video signal from said adder with said display signal.

5. A video library system permitting a search for a desired program by a user, wherein index information is recorded during a vertical blanking period of a composite video signal recorded on a video tape, by reproducing the recorded index information, said system including a sync signal separator generating a vertical sync signal and a horizontal sync signal from the composite video signal, an on-screen display circuit superimposing data on the composite video signal to produce a combined composite video signal and a motor driving said video tape during a search for said recorded index information on said video tape, said video library system comprising:

a first adder including first and second input terminals and a first output terminal, wherein a selected one of said first and said second input terminals receives said composite video signal;

a second adder including third and fourth input terminals and a second output terminal, wherein said first output terminal is serially connected to a selected one of said third and fourth input terminals;

a memory storing library data corresponding to said index information;

a microcomputer operatively coupled to a non-selected one of said first and second input terminals so as to permit addition of said index information to said composite video signal, operatively coupled to said first output terminal of said first adder so as to permit recovery of said recorded index information, and operatively coupled to a non-selected one of said third and fourth input terminals, wherein said microcomputer receives said recorded index information recovered from said video tape responsive to said horizontal sync signal, wherein said microcomputer routes at least one of said recorded index information and said library data to said non-selected one of said third and fourth input terminals so as to permit said second adder to produce said combined composite video signal, and wherein said microcomputer generates a plurality of control signals supplied to said motor for performing said search.

6. The video library system as claimed in claim 5, wherein said index information comprises a tape index signal for classifying said video tape and an index signal for identifying recorded content of each respective video tape.

7. The video library system as claimed in claim 5, further comprising an index separator operatively coupled between said first output terminal and said microcomputer and providing decoded index information to said microcomputer.

8. The video library system as claimed in claim 7, wherein said index separator comprises:

a data slicer for separating said recorded index information inserted during said vertical blanking period from said composite video signal received from said first output terminal; and a decoder for decoding said recorded index information separated in said data slicer to produce a decoded signal supplied to a microcomputer input terminal corresponding to said decoded index information.

9. The video library system as claimed in claim 5, wherein said further comprises a on-screen display circuit serially connected between said microcomputer and said non-selected one of said third and fourth input terminals, wherein said display circuit converts said recorded index information and said library data received from said microcomputer into an on-screen display signal, and wherein said composite video signal and said on-screen display signal are combined to produce the combined composite video signal.

10. The video library system as claimed in claim 5, wherein said system further comprises a key board operatively connected to said microcomputer providing key data to said microcomputer so as to permit said microcomputer to compare said library data with said recorded index information during said search.

* * * * *